Sept. 23, 1958            F. PETRIN            2,852,946
DEVICE FOR RELIEVING STARTING LOAD ON
VIBRATORS DRIVEN BY ELECTRIC MOTOR
Filed Oct. 4, 1954
FIG. 1
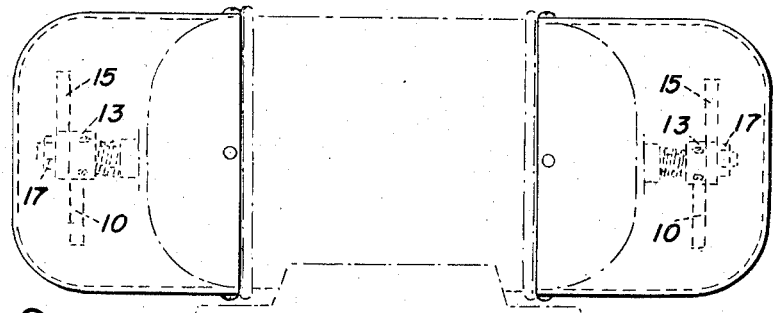
FIG. 2
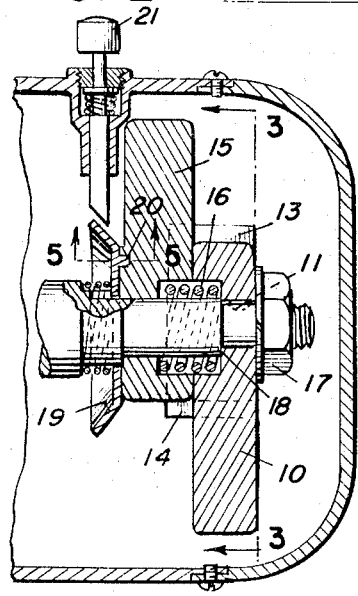
FIG. 3
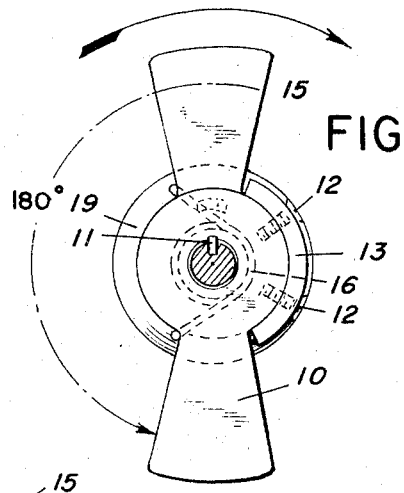
FIG. 5
FIG. 4
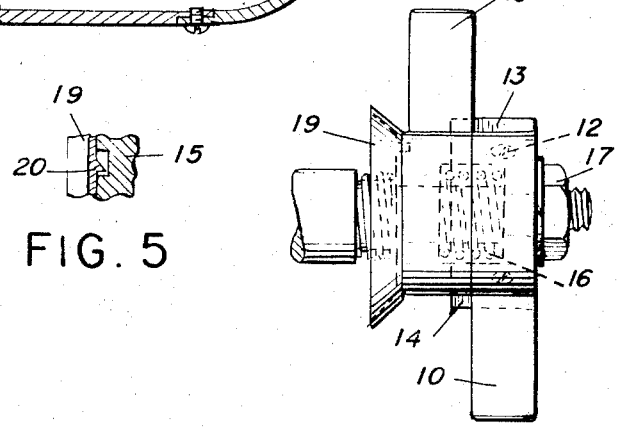
INVENTOR.
FRANK PETRIN
BY
*J. B. Dickman Jr.*
ATTORNEY

United States Patent Office 2,852,946
Patented Sept. 23, 1958

2,852,946

DEVICE FOR RELIEVING STARTING LOAD ON VIBRATORS DRIVEN BY ELECTRIC MOTOR

Frank Petrin, Elmhurst, N. Y.

Application October 4, 1954, Serial No. 460,024

4 Claims. (Cl. 74—61)

This invention pertains to a device for relieving the starting load on vibrators driven by electric motors in which the vibration is produced by weights eccentrically mounted on the motor shaft. Generally a pair of these weights are rigidly mounted, one on each end of the shaft at a common angular position about said shaft.

While only a small amount of torque is required to operate these vibrators once they are started even with very large weights, it requires a considerably greater amount of torque to overcome the acceleration of heavy weights with a great momentum before they reach their operating speed and also to overcome the gravitational effect of the weights during their upward journey at starting before they obtain sufficient momentum to help them in passing through their upward travel.

The object of the present invention is accomplished by a novel means of dividing and distributing the weights angularly about the shaft so as to initially balance them to avoid the gravitational effect until full speed is reached, then causing half of the divided portions of the weights to lag in their rotation until they are angularly lined up with the other half to provide maximum overall excentricity and vibration.

This object is clearly shown to be fulfilled by an illustrative form of construction described in the following specification when read in the light of the accompanying drawings, in which Fig. 1 illustrates a vibrator motor and shaft fitted with one form of arrangement of weights in accordance with the present invention, Fig. 2 is an enlarged detailed view of one end of the shaft and the arrangement of the weights thereon, Fig. 3 is an end view thereof, taken on the line 3—3 of Fig. 2, Fig. 4 is an elevational view of the end of the shaft similar to that shown in Fig. 2, and Fig. 5 is a detail sectional view taken on line 5—5 of Fig. 2.

The weight on each end of the shaft is split into two halves, one of which 10 is fixed rigidly to the shaft by means of a key 11. Set screws 12, screwed into the hub of this half, support an arcuate stop plate 13 thereon, having a flange portion 14 extending in the path of the other half of the weight 15 which is rotatably mounted on the shaft and held in an angular position against said flange portion at 180° from the first half 10 by means of a coil spring 16, when at rest. 17 is a retaining nut fixing the half 10 against a shoulder 18 on the shaft. The half 15, when in its balanced position as described above is normally locked in this position by a washer with a bevelled edge 19 slidably keyed to the shaft and resiliently held against the face of the weight half 15. The washer has a detent 20 which fits in a notch in the face of the half 15. When the shaft is rotating the washer may be slid on the shaft to withdraw the detent momentarily by depressing the push button 21.

In operation, when the power is switched on, the starting torque will not be influenced by any gravitational effects since the weights are locked in balanced position on the shaft. When operating speed is reached, push button 21 is depressed momentarily to unlock the weight half 15, which at the high speed of rotation immediately starts to lag against the tension of coil spring 16 until it is stopped against the flange portion 14, when both halves are all lined up in the same angular position, and maximum eccentricity and vibration is attained. Thus the starting torque and therefore the load on the electric circuit of the motor has been considerably reduced at starting as a result of the balanced distribution of the weights, and vibration permitted only after operating speed has been attained.

When the power is shut off, the shaft will cease its rotation and the spring 16 will return the weight 15, 180° to its original position as shown in Fig. 2. The detent 20 snaps into its notch on the face of half 15 and locks it in this balanced position. The parts are then in position for the next use.

Obviously other modifications of this construction may be made within the scope of this invention without departing from the essential features of the broad concept as claimed below. For example, the entire weight on one end of the shaft might be fixed rigidly at one angular position about said shaft and an equal entire weight on the other end might be resiliently held against a stop at 180° from the first weight, and locked in this position by the washer during starting and released at operating speed so that it will creep against the resilient bias until it is stopped at the same angular position as the first weight. The same concept is thus carried out in an obvious modification.

What is claimed is:

1. A motor driven vibrator having eccentrically positioned weights on the motor driven shaft for producing the vibrations, wherein half of said weights are rotatably mounted on said shaft and resiliently biased angularly in the direction of rotation, stop means on said shaft for stopping said rotatably mounted weights at 180° from the other half, spring means providing a light bias on said rotatably mounted weights against said stop means, latch means slidably mounted on said shaft and axially biased against said rotatably mounted weights to normlly lock them in said stopped position when the shaft is stopped, so as to rotationally balance said shaft at starting, means for manually moving said latch means axially to release said rotatably mounted weights when the shaft reaches operating speeds, and stop means for stopping said rotatably mounted weights at the same angular position as the other half after the rotatably mounted weights lag in their rotation, against said resilient bias as long as the operating speed is maintained.

2. A motor driven vibrator as defined in claim 1 wherein said rotatable half of said weights are distributed equally on both ends of said shaft, and said other half are likewise equally distributed on both ends of the shaft.

3. A motor having a vibrator as defined in claim 1 mounted on its shaft.

4. A motor driven vibrator as defined in claim 1, said latch means comprising a disc slidably mounted on said shaft and having a pawl cooperating with a detent in the adjacent face of said rotatably mounted weights, said disc having a beveled flange inclined away from said face, a casing around said vibrator, and said means for manually moving said latch means comprising a push button mounted in said casing in line with said beveled flange for depressing radially against said flange to move said latch means axially to release said rotatably mounted weights when the shaft reaches operating speed.

References Cited in the file of this patent

UNITED STATES PATENTS

| | | |
|---|---|---|
| 2,192,420 | Stroud | Mar. 5, 1940 |
| 2,366,342 | Lazan | Jan. 2, 1945 |
| 2,528,620 | Stroud | Nov. 7, 1950 |
| 2,677,067 | Galbraith | May 11, 1954 |